United States Patent [19]

Luscher

[11] 4,201,152

[45] May 6, 1980

[54] TRANSFER AND TEMPERATURE MONITORING APPARATUS

[75] Inventor: Paul E. Luscher, Sunnyvale, Calif.

[73] Assignee: Varian Associates, Inc., Palo Alto, Calif.

[21] Appl. No.: 881,340

[22] Filed: Feb. 27, 1978

[51] Int. Cl.² .................. C23C 13/08; H01L 21/68
[52] U.S. Cl. .................................. 118/712; 118/500; 118/729; 118/730
[58] Field of Search .................... 118/9, 50.1, 50, 730, 118/729, 712, 500; 427/86, 87; 156/601, 612; 148/175; 422/245; 115/502

[56] References Cited

U.S. PATENT DOCUMENTS

| 3,675,563 | 7/1972 | Metreaud | 118/50 |
| 3,915,765 | 10/1975 | Cho | 156/612 |
| 4,137,865 | 2/1979 | Cho | 118/49.1 |

*Primary Examiner*—Ralph S. Kendall

*Attorney, Agent, or Firm*—Stanley Z. Cole; Leon F. Herbert

[57] ABSTRACT

The temperature of a substrate being coated by molecular beam epitaxial techniques is monitored during the deposition process. The substrate is mounted on a holder that is brought by a carriage to a treating station where the deposition occurs. At the station, a pair of metal contact pins selectively contact a surface of the holder. One of the contact pins and the surface, when contacting, form a first thermocouple junction; a second thermocouple junction is formed by the second contact pin and surface. The thermocouple junctions have dissimilar properties so that a voltage indicative of the temperature of the object is derived between them while the pins and surface contact each other. The holder is transferred between the treating station and carriage by translational and rotational motion of the holder and the carriage. While the translational and rotational motions occur, contact between the surface of the holder and the pins is prevented.

19 Claims, 8 Drawing Figures

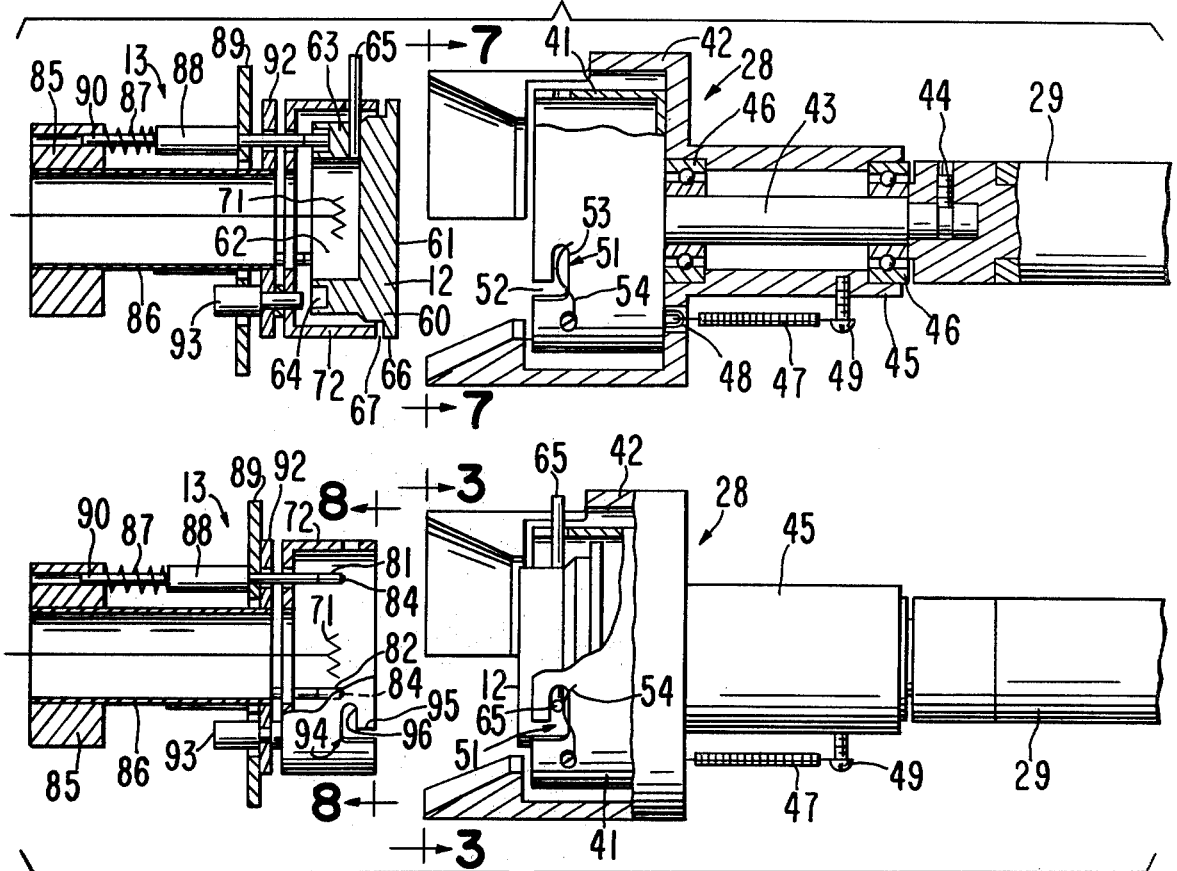

TRANSFER AND TEMPERATURE MONITORING APPARATUS

FIELD OF THE INVENTION

The present invention relates generally to apparatus for transferring from a carriage to a treating station and, more particularly, to such an apparatus wherein contact between thermocouple forming pins and a surface of the holder, which also forms part of the thermocouple, is prevented during the transfer of the holder between the carriage and the treating station.

BACKGROUND OF THE INVENTION

In many instances, it is necessary to transfer an object to a treating station at an inaccessible location. For example, in film processing under vacuum conditions, an object to be coated, such as a substrate, must be transferred between the exterior and interior of a vacuum enclosure. Typically, the substrate is fixedly mounted on a substrate holder that is carried into the vacuum by a carriage and is transferred between the carriage and a treating station, where films are deposited on the substrate.

For certain applications, such as molecular beam epitixial coating, it is necessary to maintain the substrate at a precisely controlled, elevated temperature. Typically, thermocouple junctions are utilized to monitor the temperature of the substrate. In one prior art arrangement, the thermocouple junctions were formed by fusing wires of dissimilar metals into a bead which in turn was in contact with the substrate holder. The transferring of the holder has been found to cause the junctions to wear, bend and in the case of brittle materials, fracture because of friction between them and the substrate holder. Further, the temperature of the bead itself is measured and the generally relatively marginal thermocontact between the bead and holder results in reduced accuracy and reproducibility. The wire wearing problem is particularly severe in molecular beam epitixial deposition, a process that is performed in an ultra high vacuum, on the order of $10^{-10}$ torr. Of course, in ultra high vacuums, there are few gas molecules between the contacting surfaces and the frictional problems are severe when parts rub together.

Another problem that can occur is that radiant energy from a substrate heater, controlled by the thermocouple, can propagate to the thermocouple and cause the thermocouple to derive a voltage that is not accurately related to the substrate temperature. This is particularly severe in the case of beaded thermocouples.

It is, accordingly, an object of the present invention to provide a new and improved apparatus for monitoring the temperature of an object, that can be transferred from a carriage to a treating station, while the object is located at the treating station.

A further object of the invention is to provide a new and improved mechanism for transferring an object between a treating station and a carriage.

Another object of the invention is to provide a new and improved apparatus for accurately and reproducibly monitoring the temperature of a substrate located at a treating station in a vacuum enclosure, which substrate is selectively brought to the testing station by a carriage device.

An additional object of the invention is to provide a new and improved apparatus for transferring an object from a carriage to a treating station in a vacuum and for monitoring the temperature of the object by means of thermocouples that are not subject to mechanical wear during the transfer, and which yield more accurate, reproducible measurements.

Yet another object of the invention is to provide a new and improved apparatus for transferring an object from a carriage to a treating station that includes a heater for the object, as well as a monitor for the temperature of the object, wherein radiant energy from the heater is shielded from the temperature monitoring apparatus.

BRIEF DESCRIPTION OF THE INVENTION

In accordance with the present invention, the temperature of an object that is transferred from a carriage to a treating station is determined by mounting the object on a metal holder. In one application, the object is a substrate to be coated by molecular beam epitaxial deposition techniques. In such an application, the monitored temperature is supplied to a conventional feedback controller that supplies current to an electric heater that maintains the substrate at a predetermined, elevated temperature. To monitor the temperature of the object, a pair of metal contact pins at the treating station selectively contact a surface of the holder to form a pair of thermocouple junctions. A transfer structure, that is part of the treating station and carriage, transfers the holder between a first position on the carriage and a second position on the treating station. The transfer structure includes means for providing translational and rotational motion between the holder and the treating station while the holder is being transferred. A key feature of the invention is that contact between the surface and the contact pins is prevented during the rotational and translational motions so that there is no frictional engagement between the contact pins and the holder during this interval, whereby damage to the contact pins and holder does not occur during the transfer. The transfer structure is also designed so that there is a minimum of contact between moving parts during the transfer operation, thereby to minimize friction and wear between the parts so that the life thereof is prolonged.

In accordance with a further feature of the invention, the thermocouple contact pins are shielded from the substrate heater while the substrate is at the treating or deposition station. The shielding is attained by providing the substrate holder with a central cavity in which the heater fits while the holder is fixedly held at the station. The shielding is attained by forming the perimeter of the cavity as a lip having a groove into which the contact pins fit while the holder is affixed at the station.

The above and still further objects, features, and advantages of the invention will become apparent upon the following description of the enclosed drawing.

BRIEF DESCRIPTION OF THE DRAWING

FIG. 2 is a side, partially sectional view of a carriage approaching a treating station with a substrate holder mounted thereon;

FIG. 3 is a front view of the carriage illustrated in FIG. 2, taken along the lines 3—3;

FIG. 4 is a partial sectional view of the carriage, substrate holder and treating station immediately after the carriage has been translated into engagement with the treating station;

FIG. 5 is a side view of the carriage, treating station, and substrate holder when the substrate holder has been rotated into place on the treating station;

FIG. 6 is a side, partially sectional view of the carriage, substrate holder, and treating station after the substrate holder has been transferred to the treating station;

FIG. 7 is a front view of the carriage after the holder has been transferred to the treating station, as taken along the line 7—7, FIG. 6; and FIG. 8 is a front view of the treating station, as taken along the line 8—8, FIG. 2.

DETAILED DESCRIPTION OF THE DRAWING

Figure 1:
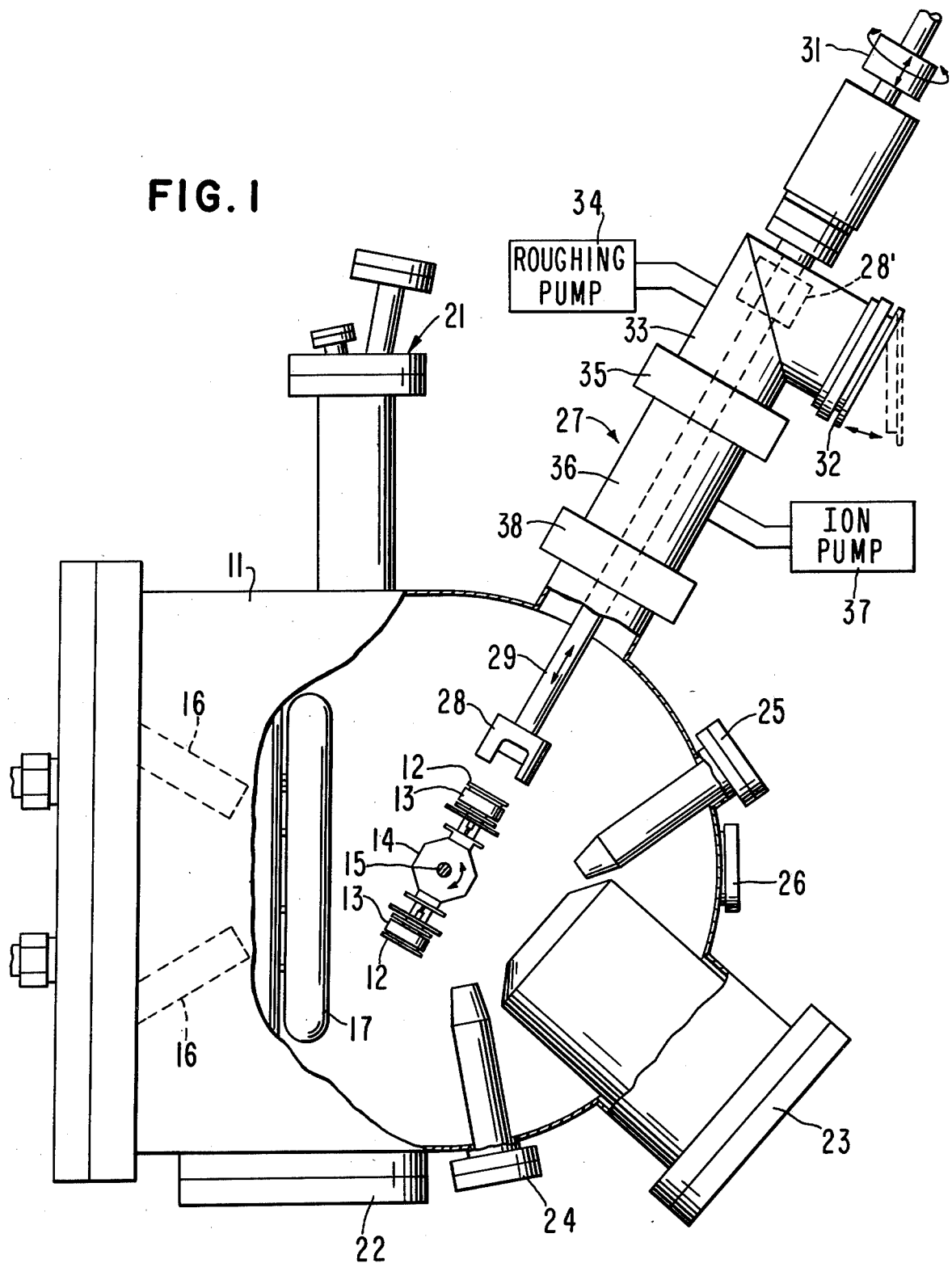
FIG. 1 is a top, partially sectional view of a molecular beam epitixial deposition system including the present invention.

Reference is now made to FIG. 1 of the drawing wherein there is illustrated an evacuated enclosure 11, maintained by a suitable vacuum system (not shown) at a vacuum of approximately $10^{-10}$ torr, the base vacuum required for molecular beam epitaxial deposition. Substrates to be coated with the material in the molecular beams are mounted on substrate holders 12 which are selectively positioned on treatment stations 13, at diametrically opposed ends of carousel 14 that rotates about axis 15. Molecular beams are formed in furnaces 16 and propagate to a substrate properly positioned on holder 12. A cryopump 17 is in the vicinity of furnaces 16 and the substrates on substrate holders. Suitable shutters (not shown) are included within enclosure 11 to control the flow of molecular beams from furnaces 16 to the substrates, as well as to isolate analyzing apparatus from the molecular beam while it is being deposited on one of the substrates.

The substrate is analyzed by a multiplicity of instruments which extend into enclosure 11 from displaced positions about the periphery of the enclosure. These instruments include a reflection electron defraction system including electron gun 21 and phosphor screen 22, that monitors the surface of a crystal substrate prior to and during epitixial growth. In addition, an Auger electron spectrometer 23 enables the elemental composition of the films or coatings formed on the substrate to be identified. A quadrupole mass spectrometer (not shown) continuously monitors the composition of residual gases, as well as the molecular beams within chamber 11. Substrate cleaning ion gun 24 and profiling ion gun 25 extend into chamber 11. Viewing port 26 is provided on the wall of the chamber 11 to enable an operator to determine what operations are being performed within the chamber, as well as to determine if substrate holders 12 are correctly in situ on treating stations 13. The apparatus previously described in connection with FIG. 1 is known to those skilled in the art.

In accordance with the present invention, a new and improved mechanism 27 is provided for enabling a substrate holder 12 to be brought from the environment outside of enclosure 11, to within the enclosure and, once inside the enclosure, into a fixed position on station 13, as well as for enabling the substrate holder to be withdrawn from the treatment station and brought to the environment outside of the chamber. Mechanism 27 includes a carriage 28, mounted on translatable and rotatable rod 29, that is driven by magnetic drive 31, located externally of enclosure 11. Magnetic drive 31 translates carriage 28 from the dotted line position 28' into contact with treatment station 13, and then rotates the carriage to pick up and deposit substrate holder 12 at treatment station 13.

Initially, carriage 28 is at the retracted position, adjacent vacuum door 32, where holder 12, having a substrate fixedly mounted thereon, is inserted into the carriage. Door 32 is then closed, and a vacuum is formed in region 33 by a roughing pump 34. After region 33 has been sufficiently evacuated (1–10 microns), valve 35, between region 33 and region 36 which is continuously evacuated by ion pump 37, is opened and region 33 is then evacuated by ion pump 37; when regions 33 and 36 have been sufficiently evacuated ($10^{31\ 5}$–$10^{-9}$ Torr), valve 38 is opened and carriage 28 is driven by shaft 29 into enclosure 11.

After substrate holder 12 has been deposited at treatment station 13, an electric heater (not shown in FIG. 1) is activated. The current flowing through the electric heater is controlled in response to the temperature of substrate holder 12, as monitored by a thermocouple. The thermocouple derives a voltage indicative of the temperature of substrate holder 12, and this voltage is supplied to a conventional feedback controller for the heater.

The mechanisms of substrate holder 12, treatment station 13, and carriage 28 are illustrated in FIGS. 2–7. As part of these mechanisms is apparatus for transferring substrate or object holder 12 between carriage 28 and station 13. In these Figures are also illustrated the resistance substrate heater and the temperature monitoring thermocouple junctions.

Holder 12 is generally formed as a metal, preferably molybdenum, cup having a body portion 60 including a planar, circular cross section front face 61 on which the substrate to be coated is mounted, in a known manner. Formed in the back face of body 60, opposite from face 61, is a central cavity 62, generally maintained in a coaxial relationship with the axis of shaft 29 while the holder is fixedly mounted both in carriage 28 and in station 13, as well as during the transfer operation between the carriage and station. The perimeter of cavity 62 defines the inner surface of an annular lip 63. An annular groove 64, which must be metal even if holder 12 is fabricated of dielectric material, is provided in the face of lip 63 opposite from face 61. Bayonet pins 65, angularly displaced from each other by 120°, extend radially from lip 63, beyond the perimeter of face 61. Body 60 incorporates a circular flange 66 including a shoulder 67 that may serve as a stop against a fixed part of station 13, as described infra. Flange 66 also serves against deposition of the molecular beams within cup 72 and aligns body 60 along the wall of cup 41 during a transfer operation.

As most clearly illustrated in FIG. 6, carriage 28 includes an inner cup 41 and an outer cup 42; both cups 41 and 42 are coaxial with shaft 29. Shaft 29 is fixedly connected to cup 41 through stem 43 that extends from the back face of cup 41 and is secured to shaft 29 by set screw 44. Cup 42 includes a sleeve 45 that is coaxial with and surrounds stem 43; the sleeve is coupled to the stem by bearings 46. Cups 41 and 42 are normally maintained at a predetermined rotational position by spring 47, having one end connected to the back face of cup 41 by finger 48, and a second end that is fixedly connected to sleeve 45 by stud 49. Finger 48 extends through an arcuate slot, having an angular extent of approximately 60', in the back face of cup 42.

Extending from the edge on the open face of cup 41 are three slots 51, angularly displaced from each by 120 degrees; slots 51 selectively receive bayonet pins 65 on holder 12. Slots 51 include longitudinally extending portions 52, that extend parallel to the axis of shaft 29, as well as circumferentially extending portions 53, that extend partially around the cylindrical surface of cup 41. Mounted in proximity to slot 51 is a leaf spring 54 that extends in the same general direction as circumferential slot portion 53. Leaf spring 54 includes a bulge that extends longitudinally along the axis of shaft 29, toward treating station 13. The bulge extends approximately to the edge of slot portion 53 closest to the edge of cup 41 that is adjacent to station 13. The bulge enables spring 54 to capture bayonet pin 65 when holder 12 is fixedly mounted to carriage 28.

Extending from the edge on the open face of cup 42 are three equi-angularly displaced apertures 55, best illustrated in FIG. 4. Each of apertures 55 includes a pair of facing shoulders 56 and 57, that extend longitudinally of the axis of shaft 29. Between adjacent pairs of the shoulders and extending from the front face of cup 42, there is an inwardly extending tapered surface 58 that aligns the substrate holder 12 coaxially with shaft 29 and manipulates the thermocouple pins during transfer of the holder from carriage 28 to station 13. Spring 47 normally biases cups 41 and 42 so that longitudinally extending portion 52 of slot 51 is approximately equidistant from facing shoulders 56 and 57. Because of the taper of surface 58 the coaxial alignment of holder 12 is attained even if there is a tendency for shaft 29 to be slightly displaced relative to station 13, which remains fixed during the transfer operation.

Station 13 includes resistance heater 71, schematically shown as a resistor. Heater 71 is fixedly mounted to station 13 and is fixedly positioned within cup 72, that is coaxial with shaft 29 during transfer, so that the heater is within cavity 62 when holder 12 is fixedly secured to station 13. Dimensions of the carriage, holder, station and heater are such that the heater cannot be touched by the holder 12 during transfer, thereby to avoid fracturing problems of the filament which could otherwise occur during transfer.

Station 13 also includes axially extending, retractable, dielectric pins 81, 82 and 83 which are normally biased so that their ends are co-planar; pins 81-83 are angularly displaced from each other by 120 degrees. Extending through the length of each of pins 81-83 is a small metal wire that is formed as loop 84 at one end of the pins. The metals of the wires for pins 81 and 82 differ from each other so that thermocouple junctions having different EMF properties are formed between the wire loops 84 associated with pins 81 and 82 and the metal of holder 12 when the loops and holder are in contact with each other; in a preferred embodiment the two wires have differing rhenium compositions such as W5Re and W26Re. The holder is sufficiently massive and possesses sufficiently good thermal conductivity that the temperature is essentially uniform throughout the holder, in which case the EMF generated across the wire loops and holder is equivalent to that generated across a junction of the wire loops alone at the temperature of the holder at their point of contact, thus allowing standard thermocouple tables to be used. The wires extending through pins 81 and 82 thereby have a voltage developed across them indicative of the temperature of holder 12 and the substrate mounted thereon, while the holder and pins 81-83 are in contact. The wire loop of the remaining pin 83 is not electrically conncted, but merely establishes a mechanically stable, planar surface, together with the loops associated with pins 81 and 82, against which the inner face of groove 64 of holder body 60 abuts. The electrical voltage developed between the wires extending through pins 81 and 82 is supplied to a conventional feedback circuit that supplies current to resistance heater 71, so that the flow of current to the heater maintains the substrate and holder 12 at a desired temperature.

The particular physical arrangement of heater 71, holder 12 and pins 81 and 82 substantially prevents the propagation of direct and reflected radiant energy from heater 71 to the thermocouple junctions established by pins 81 and 82 against body 60 of holder 12. As noted in FIG. 6, when holder 12 is in situ at station 13, there is no line of sight path from heater 71 to the thermocouple junctions, but there is radiant energy shielding between the heater and wire loops 84 of pins 81 and 82 at the inner face of groove 64. The shielding occurs because of the mass of metal in lip 63 and the relatively narrow and deep groove 64 in which loops 84 are buried. The mass of metal prevents the direct propagation of radiant energy from the heater to the thermocouple junctions, while burying the loops in groove 64 substantially prevents propagation of reflected radiant energy to the loops. Because of the shielding, the temperature monitored by the thermocouples associated with pins 81 and 82 is not materially affected by radiant energy from heater 71 and accurate temperature indications are obtained.

An important feature of the invention is that wire loops 84 are not in contact with the inner face of groove 64 while holder 12 is being translated and/or rotated into position on station 13. Thereby, the life of wire loops 84 is extensively prolonged and scoring of the inner face of groove 64 is prevented.

To these ends, pins 81—83 are selectively retracted relative to cup 72, fixedly mounted relative to carousel 14. Each of pins 81-83 is fixedly mounted on a separate longitudinally extending sleeve 88; opposite ends of each of sleeves 88 abut against one face of floating annular plate 89 and one end of compression spring 87. Each of springs 87 is coaxial with and surrounds a narrowed section 90 of sleeve 88, one end of which extends into a longitudinal bore in ring 85. Ring 85, which is fixedly mounted on carousel 14, is in turn fixedly secured to one end of sleeve 86. Fixedly secured to the other end of sleeve 86 is annular stop plate 92 that limits the forward motion of plate 89 and pins 81-83.

Cup 72 is fixedly mounted at station 13 by virtue of its connection by stud 93 to fixed plate 92. Cup 72 and plate 92 include aligned, longitudinally extending bores, angularly displaced by 120 degrees from each other, through which pins 81-83 extend.

Cup 72 is coaxial with sleeve 86, and hence cups 41 and 42, during the transfer operation. The outer diameter of cup 72 is less than the inner diameter of cup 41, so that the former can fit into the former during the transfer operation. The inner diameter of cup 72 is greater than the outer diameter of annular lip portion 63 and shoulder 67 of holder body 60 so that the holder body can fit within cup 72. The outer diameter of cup 72 is approximately equal to the diameter of flange 66 on holder body 60, so that the cup can serve as a stop, if necessary, for the holder as it is translated and/or rotated during the transfer operation.

To enable station 13 to capture holder 12, cup 72 includes three slots 94, angularly displaced by 120 degrees from each other. Each of slots 94 is similar to slots 51 on cup 41, because it includes a longitudinally extending slot portion 95, as well as a circumferentially extending slot portion 96. Circumferentially extending slot portions 96 and 53 of slots 94 and 51 extend in the same direction, when the mechanism is viewed from the side, as in FIG. 2.

To understand the operation of the mechanism illustrated in FIGS. 2-8, a sequence of operation will be described, assuming that holder 12 is mounted on carriage 28, as illustrated in FIG. 2, and that the holder is transferred to treatment station 13 by translating and rotating the carriage, as indicated by FIGS. 4 and 5, and that the holder is finally positioned at station 13, as illustrated in FIG. 6.

As shown in FIG. 2, as carriage 28 is approaching station 13, holder 12 is fixedly mounted on the carriage by virtue of bayonet pins 65 being captured between leaf springs 54 and the closed ends of circumferentially extending slot portions 53. As carriage 28 is translating holder 12 into station 13, a camming surface at the nose end of cup 42 bears against a cammed surface on the face of plate 89. The camming surface of cup 42 translates plate 89 to a retracted position, against the bias of springs 87 so that pins 81-83 are driven to a retracted position (FIG. 4) which is out of contact with the inner face of groove 64. As plate 89 and pins 81-83 are driven to the retracted position, bayonet pins 65 are translated through the longitudinally extending portion 95 of slots 94.

With plate 89 and pins 81-83 in the fully retracted position and bayonet pins 65 at the back end of the longitudinally extending groove portions 95, shaft 29 is rotated so that cup 41 and holder body 60 are rotated by shaft 29, while outer cup 42 remains stationary. At this time pin 65 rotates in portions 96 of slot 94, away from longitudinally extending groove portions 95 toward the closed end of circumferential groove portions 96. Continued rotation of cup 41 causes pins 65 to bear against spring 54; ultimately the force of springs 54 is overcome, and cup 41 rotates until it is stopped by pin 65 engaging the wall that is aligned with the bottom edge (as viewed in FIG. 5) of longitudinal groove portion 52. Thereby, bayonet pins 65 are captured in grooved portions 96 and released from grooved portions 53 so holder 12 has been transferred to treatment station 13.

Shaft 29 then translates carriage 26 away from treatment station 13, whereby spring 87 bias wire loops 84 of pins 81-83 against the inner face of groove 64 to establish the thermocouple junctions and to fixedly secure holder 12 at station 13. The forward movement of pins 81-83 is stopped by the inner face of groove 64 so that plate 89 is in a slightly retracted position relative to plate 92, as illustrated in FIG. 6. Because of the restoring force of spring 47, upon lateral withdrawal of the carriage from the station cup 42 rotates relative to cups 72 and 41, whereby cups 41 and 42 are once again aligned.

To transfer holder 12 from station 13 to carriage 28, the opposite sequence is followed, whereby wire loops 84 are initially pushed away from the inner face of grooves 64, pins 65 are rotated relative to groove portions 53 and 96 and are then captured between spring 65 and the inner end of circumferentially extending groove portions 53. Shaft 29 then translates carriage 28 and holder 12 away from station 13 so that a new substrate holder can be loaded into the carriage. Loading of the new substrate holder onto the carriage is accomplished with a mechanism similar to that included at station 13.

This mechanism is inserted onto carriage 28 in region 33, through door 32. Alternatively the loading of the new substrate holder can be accomplished by hand.

It is to be understood that many changes can be made in the specifically described embodiment without departing from the scope of the invention and that the invention is to be determined from the scope of the following claims, and not limited to the specifically described embodiment.

What is claimed is:

1. Apparatus for monitoring the temperature of an object located at a treating station and for enabling the object to be transferred from a carriage to the treating station, and vice versa, said apparatus comprising:
   a metal holder for the object,
   first and second metal contact pins at the treating station, said pins being arranged to selectively contact a surface of the holder, said first contact pin and surface when contacting forming a first thermocouple junction, said second contact pin and surface when contacting forming a second thermocouple junction, said junctions having dissimilar properties so that a voltage indicative of the temperature of the object is derived between them while the pins and surface contact each other,
   said treating station including means for selectively fixedly holding the holder,
   said carriage including means for selectively fixedly holding the holder,
   said treating station and carriage including means for transferring the holder between the carriage and the treating station, said transferring means including means for providing translational and rotational motion between the holder and the treating station during a transfer of the holder, and
   means for preventing contact between the holder surface and the pins during the rotational motion.

2. The apparatus of claim 1 wherein the contact preventing means includes means for preventing contact between the holder surface and the pins during the translational and rotational motion.

3. The apparatus of claim 2 wherein the preventing means includes a member on the station for controlling the translational motion of the pins,
   said carriage including a drive means for selectively translating the control member,
   means for normally biasing the control member to a predetermined longitudinal position while the holder is not in proximity to the treating station so that the pins are in a preselected longitudinal position where they do not contact the surface as the carriage is translating the holder into contact with the treating station and for biasing the control member so the pins contact the holder surface after the holder has been transferred to the treating station and the carriage has been translated away from the treating station, the drive member engaging the control member to urge the control member against the bias means and to retract the control member from the predetermined position as the carriage is translating and rotating the holder into fixed engagement with the treatment station so that the pins are translated away from the preselected position as the carriage is translating and rotating the holder into fixed engagement with the treatment station.

4. The apparatus of claim 3 wherein the transfer means includes:

a first cylindrical surface at the treatment station,
a second cylindrical surface on the carriage,
means for maintaining said first and second cylindrical surfaces coaxial during transfer of the holder,
means for rotatably driving one of said cylindrical surfaces relative to the other during transfer of the holder,
said holder including fixedly mounted outwardly extending bayonet pins,
each of said surfaces including slots for selectively receiving the bayonet pins and for enabling the bayonet pins to be translated and rotated therein during transfer of the holder.

5. The apparatus of claim 3 further including a heater at the station for heating the holder while it is at the station, and
radiant energy shielding means positioned between the heater and the metal contact pins for substantially preventing radiant energy heating by the heater of the contact pins.

6. The apparatus of claim 5 wherein the holder includes a central cavity into which the heater fits while the holder is fixedly held at the station,
said shielding means including a lip having a surface forming the perimeter of the cavity, said lip including a groove into which the contact pins fit while the holder is fixed at the station.

7. The apparatus of claim 1 wherein the transfer means includes:
a first cylindrical surface at the treatment station,
a second cylindrical surface on the carriage,
means for maintaining said first and second cylindrical surfaces coaxial during transfer of the holder,
means for rotatably driving one of said cylindrical surfaces relative to the other during transfer of the holder,
said holder including fixedly mounted outwardly extending bayonet pins,
each of said surfaces including slots for selectively receiving the bayonet pins and for enabling the bayonet pins to be translated and rotated therein during transfer of the holder.

8. The apparatus of claim 7 wherein each of the slots on the second cylindrical surface has longitudinally and circumferentially extending portions,
and further including spring means in proximity to each of the circumferentially extending slot portions, said spring means selectively holding the bayonet pins in situ against a closed end of the circumferentially extending slot portion.

9. The apparatus of claim 8 wherein each of the slots on the first cylindrical surface has longitudinally and circumferentially extending portions, the circumferentially extending portions of the slots on the first and second cylindrical surfaces extending in the same direction relative to their corresponding longitudinal slots during transfer of the holder, when viewed from the side of the cylindrical surfaces.

10. The apparatus of claim 7 wherein the transfer means includes a third cylindrical surface on the carriage, said third cylindrical surface being rotatable relative to and coaxial with the second cylindrical surface, said third cylindrical surface including longitudinally extending shoulders, and
spring means tending to maintain the second and third cylindrical surfaces at a predetermined angle relative to each other, said predetermined angle being such that the longitudinally extending slot portions are approximately equidistant between a pair of facing shoulders, the closed ends of the circumferentially extending portions of the slots being remote from the shoulders while the second and third surfaces are at the predetermined angle.

11. The apparatus of claim 10 wherein the third cylindrical surface is on a cup having tapered surfaces facing the treating station so that the second cup is guided into a coaxial relation with the first cup as the carriage is being translated into proximity with the station.

12. The apparatus of claim 2 further including a heater at the station for heating the holder while it is at the station,
and radiant energy shielding means positioned between the heater and the metal contact pins for substantially preventing radiant energy heating by the heater of the contact pins.

13. The apparatus of claim 12 wherein the holder includes a central cavity into which the heater fits while the holder is fixedly held at the station,
said shielding means including a lip having a surface forming the perimeter of the cavity, said lip including a groove into which the contact pins fit while the holder is fixed at the station.

14. The apparatus of claim 1 further including a heater at the station for heating the holder while it is at station,
and radiant energy shielding means positioned between the heater and the metal contact pins for substantially preventing radiant energy heating by the heater of the contact pins.

15. The apparatus of claim 14 wherein the holder includes a central cavity into which the heater fits while the holder is fixedly held at the station,
said shielding means including a lip having a surface forming the perimeter of the cavity, said lip including a groove into which the contact pins fit while the holder is fixed at the station.

16. In combination,
a vacuum enclosure, said vacuum enclosure including a treatment station for a substrate,
a holder for the substrate,
a carriage for bringing the holder from outside of the vacuum enclosure into the enclosure and thence to the station and from the station to outside of the enclosure,
means for selectively fixedly mounting the holder at the station,
means for selectively fixedly mounting the holder on the carriage,
a heater at the station for heating the holder and substrate while they are fixedly mounted at the station, and thermocouple means at the station for monitoring the temperature of the holder and substrate while they are fixedly mounted at the station and for deriving a control signal for the heater, said thermocouple means including first and second metal contact pins at the treating station, said pins being arranged to selectively contact a surface of the holder, said first contact pin and surface when contacting forming a first thermocouple junction, said second contact pin and surface when contacting forming a second thermocouple junction, said junctions having dissimilar properties so that a voltage indicative of the temperature of the object is derived between them while the pins and surface contact each other, said treating station and carriage including means for transferring the holder between the carriage and the treating station, said transferring means including means for providing translational and rotational motion between the holder and the treating station during transfer of the holder, and means for preventing contact between the surface and the pins during the rotational motion.

17. The combination of claim 16 wherein the contact preventing means includes means for preventing contact between the holder surface and the pins during the translational motion.

18. The combination of claim 16 further including:

radiant energy shielding means positioned between the heater and the metal contact pins for substantially preventing radiant energy heating by the heater of the contact pins.

19. The apparatus of claim 18 wherein the holder includes a central cavity into which the heater fits while the holder is fixedly held at the station, said shielding means including a lip having a surface forming the perimeter of the cavity, said lip including a groove into which the contact pins fit while the holder is fixed at the station.

* * * * *